US012661825B2

(12) United States Patent
Whelan et al.

(10) Patent No.: US 12,661,825 B2
(45) Date of Patent: Jun. 23, 2026

(54) BOARD DERIVED FROM RECYCLED WASTE MATERIAL COMPRISING POLYVINYLCHLORIDE

(71) Applicant: SIKA TECHNOLOGY AG, Baar (CH)

(72) Inventors: Brian J. Whelan, Canton, MA (US); Albert J. Duhamel, Tiverton, RI (US); Xiong Jiang, Canton, MA (US); Blaise W. Leeber, Burlington, MA (US); Ajay Padwal, Sharon, MA (US)

(73) Assignee: SIKA TECHNOLOGY AG, Baar (CH)

( * ) Notice: Subject to any disclaimer, the term of this patent is extended or adjusted under 35 U.S.C. 154(b) by 42 days.

(21) Appl. No.: 18/431,094

(22) Filed: Feb. 2, 2024

(65) Prior Publication Data

US 2025/0249622 A1    Aug. 7, 2025

(51) Int. Cl.
| | |
|---|---|
| *B27N 3/00* | (2006.01) |
| *B27N 3/04* | (2006.01) |
| *B27N 3/08* | (2006.01) |
| *B29C 43/00* | (2006.01) |
| *B32B 27/30* | (2006.01) |

(52) U.S. Cl.
CPC ............. *B27N 3/002* (2013.01); *B27N 3/007* (2013.01); *B27N 3/04* (2013.01); *B27N 3/08* (2013.01); *B29C 43/006* (2013.01); *B32B 27/304* (2013.01); *B32B 2327/06* (2013.01); *Y02W 30/58* (2015.05); *Y02W 30/62* (2015.05)

(58) Field of Classification Search
CPC ....... Y02W 30/58; Y02W 30/62; B27N 3/007
See application file for complete search history.

(56) References Cited

U.S. PATENT DOCUMENTS

| | | | |
|---|---|---|---|
| 5,145,617 A * | 9/1992 | Hermanson ........... | B29C 48/305 |
| | | | 425/208 |
| 10,808,405 B2 | 10/2020 | Kelly | |
| 11,060,290 B1 | 7/2021 | Rayman, Jr. et al. | |
| 11,738,486 B2 | 8/2023 | Winterowd et al. | |
| 11,806,972 B2 | 11/2023 | Winterowd et al. | |
| 2023/0173713 A1 | 6/2023 | Fisher et al. | |
| 2023/0332410 A1 | 10/2023 | Spencer et al. | |
| 2024/0001663 A1 | 1/2024 | Winterowd et al. | |
| 2025/0187317 A1 | 6/2025 | Kelly | |

FOREIGN PATENT DOCUMENTS

| | | | | |
|---|---|---|---|---|
| DE | 4106510 A1 * | 9/1992 | ............. | B29B 17/02 |

OTHER PUBLICATIONS

English machine translation of DE4106510 (Year: 1992).*

* cited by examiner

*Primary Examiner* — Scott W Dodds
(74) *Attorney, Agent, or Firm* — Oliff PLC

(57) ABSTRACT

A board for use in a construction related application, the board including:
  a) a core layer having first and second major surfaces and
  b) a first facing layer directly adjacent to the first major surface of the core layer,
  wherein the core layer includes recycled polyvinylchloride membrane waste material.

10 Claims, 2 Drawing Sheets

BOARD DERIVED FROM RECYCLED WASTE MATERIAL COMPRISING POLYVINYLCHLORIDE

TECHNICAL FIELD

This disclosure relates to a board used in construction related applications, such as roof cover boards used in a roof system, derived from recycled polyvinylchloride containing waste materials, particularly from post-industrial (pre-consumer) or post-consumer polyvinylchloride membrane waste materials. This disclosure also relates to a method for producing a board using waste material feedstock including polyvinylchloride containing waste material fractions.

BACKGROUND ART

According to an estimate of United States Environmental Protection Agency (EPA), 600 million tons of construction and demolition (C&D) waste were generated in the US in 2018, which is more than twice the amount of generated municipal solid waste. C&D waste materials are generated when new building and civil-engineering structures are built and when existing buildings and civil-engineering structures are renovated or demolished. These types of waste materials are commonly characterized as "post-consumer" waste since they have been generated after the product has been delivered to the end user.

Waste materials are also generated during manufacturing of products used in the field of construction. These waste materials are typically referred to as "pre-consumer" or "post-industrial" waste materials since they have been recovered during or as a result of manufacturing of the construction articles. Post-industrial waste materials include waste fractions generated during the production process but also off-spec products that have never been used for their intended purpose.

Recycling of post-industrial and post-consumer polyvinylchloride (PVC) waste is well established practice in various segments of industry. For example, recycling of edge trimmings, off-spec membranes, and other scrap material generated during production of PVC roofing membranes has been a standard practice for more than a decade.

A recycling process for PVC membrane waste typically comprises reducing particle size of the membrane scrap material, for example by shredding or grinding, and removing the bulk of the fiber-based material, which may be present in the membrane as a reinforcing and/or backing layer. The comminuted membrane material could then be used to manufacture PVC-based products, such as roofing membranes, walkway pads, and other roof accessories. After processing into granules, the modern production lines are also capable of incorporating the membrane recyclate directly into their feedstock. Despite the technological advances in recycling of roofing membrane materials, recycling of post-consumer membrane waste has not yet been realized on a large scale.

One of the challenges in recycling of PVC roofing membrane waste is related to the processing of the fiber-based fraction, which is separated from the polymer matrix of the membrane as a "residual fluff" during the grinding step. The residual fluff can be collected and used as a recyclate in some applications, for example, as a reinforcing fiber material in the production of cement blocks. The residual fluff is also commonly incinerated to produce energy from waste or sent to a landfill. However, due to the presence of PVC, the residual fluff is not a favored feedstock to produce energy from waste. Furthermore, disposing the residual fluff to a landfill is unacceptable as a long-term solution from environmental and sustainability point of view.

It would be desirable to recycle the residual fluff, but this has turned out to come with various challenges. Residual fluff cannot be easily processed into articles by melt-extrusion since the melting temperature of the fibers is well above the decomposition temperature of the PVC resin. Furthermore, the risk that any non-melted fibers would accumulate on the breaker plate or die of the extruder resulting in formation of clogs is very high.

Outer exterior surfaces of buildings have to be protected from environmental forces such as wind and rain. Roofing membranes composed of polymeric materials are typically used for waterproofing of flat or slightly sloped roofs whereas sloped roofs are typically covered with roof shingles. In addition to waterproofing, the outermost layer of a building should provide sufficient thermal insulation and fire resistance properties, both of which cannot be achieved using polymeric membranes alone. Consequently, roofing assemblies are provided as multi-component structures, in which individual layers have been designed for a specific purpose. Commonly used low-slope roof assemblies typically comprise at least a vapor control layer, a rigid insulation board, typically EPS, XPS, or polyisocyanurate (PIR), and a roofing membrane. The roofing membrane can be installed directly on the top of the insulation board. The insulation boards based on polymeric foam materials have a low compression strength and fire resistance properties. For example, regular low density PIR foams are especially susceptible to mechanical impacts caused from foot traffic and dropped tools.

Therefore, cover boards (also known as hardboards) are commonly used to protect insulation boards from damage during and after installation of roofing systems. The roofing membrane can then be installed over the cover board. Cover boards can also provide additional hail and impact resistance and they have been used to improve hail rating of roofing systems. Roof cover boards or boards having similar properties than cover boards are also used in other construction related applications, for example, to provide a sound barrier in a wall or to protect other structures than roofs at the construction site from mechanical and environmental impacts. Cover Boards can also provide additional fire protection to the roof assembly and building.

Commonly used cover boards for roof systems include, for example, gypsum boards, fiber-reinforce gypsum boards, wood fiber boards, cementitious boards, high-density (compressed) polyisocyanurate boards, perlite boards, asphaltic boards, mineral fiber boards, and plywood or oriented strand boards. Cover boards made of recycled waste materials, such as plastic-coated cardboard packings and other post-consumer waste materials, are also known. U.S. Pat. No. 10,808,405 B2 discloses a cover board including a core layer formed from composite material including a recycled cardboard material encapsulated by a plastic material. Furthermore, U.S. Pat. No. 11,060,290 relates to a cover board product with a panel comprised of a top surface layer comprised of either paper or a fiberglass web, a bottom surface layer comprised of either paper or a fiberglass web, and a core layer comprised of discrete paper fragments and polypropylene fragments, which are connected by use of a thermoplastic bonding resin comprising polyethylene. Cover boards made of recycled waste material comprising polyvinylchloride have not been previously disclosed.

There is thus a need for a new type of board suitable for use in construction related applications, such as in roof systems, which board is at least partially based on recycled waste materials, particularly polyvinylchloride containing recycled waste materials, to reduce the amount of construction waste sent to landfills. The board should preferably provide improved properties, particularly in terms at least one of impact protection, water resistance, fire resistance, and thermal dimensional stability. Preferably, the new type of board would also be recyclable at the end of service life.

SUMMARY OF THE INVENTION

One object of the present invention is to provide an improved board, which overcomes or at least mitigates the disadvantages of the boards of prior art based on the use of recycled waste materials.

Particularly, the object is to provide an improved board that is at least partially based on recycled roof waste materials, particularly recycled polyvinylchloride containing waste materials, to reduce the amount of construction waste sent to landfill. The board should also provide improved application properties, particularly in terms at least one of impact protection, water resistance, fire resistance, and thermal dimensional stability.

Surprisingly, it was discovered that the object can be achieved with the features described herein.

Specifically, according to embodiments of the invention, a board for use in construction related application, for example a cover board for use in a roofing system, a sound barrier board for use in a wall, or a protection board for use on a construction site, is proposed, the board including:
- a) a core layer having first and second major surfaces and
- b) a first facing layer directly adjacent to the first major surface of the core layer,
  wherein the core layer includes recycled polyvinylchloride membrane waste material.

The recycled polyvinylchloride membrane waste material can be derived from any type of polyvinylchloride membrane waste, such as pre-consumer and/or post-consumer polyvinylchloride membrane waste.

As it turned out, the proposed board can be prepared with a fairly simple industrial process comprising compressing and fusing of a waste material feedstock including one or more different types of polyvinylchloride membrane waste fractions having a reduced particle size.

It was also surprisingly discovered that polyvinylchloride membrane waste including the residual fluff fraction, which is obtained as a by-product during mechanical recycling of the membrane waste, can be mixed with other waste materials and used as a raw material for the preparation of boards. Furthermore, cover boards prepared according to the suggested process were found to exhibit improved properties compared to cover boards of prior art based on the use of recycled waste materials.

Additional aspects of the present invention are defined in further independent claims. Particularly preferred embodiments are outlined throughout the description and the dependent claims.

DETAILED DESCRIPTION OF THE INVENTION

Figure 1:
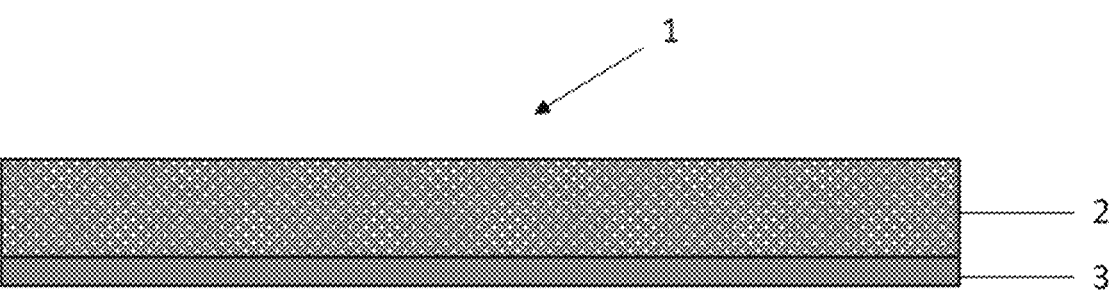
FIG. 1 is a schematic diagram showing a cross-section of a board according to one embodiment.

In one aspect, this disclosure relates to a board for use in construction related application, for example and not limited to a cover board for use in a roofing system, a sound barrier board for use in a wall, or a protection board for use on a construction site, the board including:
- a) a core layer having first and second major surfaces and
- b) a first facing layer directly adjacent to the first major surface of the core layer,
  wherein the core layer includes recycled polyvinylchloride membrane waste material.

The board may be a cover board for use in a roofing system, a sound barrier board for use in a wall, or a protection board for use on a construction site, particularly a cover board for use in a roofing system.

The core layer of the board includes recycled polyvinylchloride membrane waste material.

The term "recycled material" refers in the context of the present disclosure to a material that has been reprocessed from (reclaimed) waste material through a manufacturing process and made into a final product, a material or a component for incorporation into another product. Consequently, the term "recycled polyvinylchloride membrane waste material" is understood to mean any material that has been obtained from a recycling process, such as a mechanical recycling process, using polyvinylchloride membrane waste as a feedstock for the process.

Particularly, the recycled polyvinylchloride membrane waste material includes recycled pre-consumer and/or post-consumer polyvinylchloride membrane waste.

The terms "pre-consumer" and "post-consumer" are considered to have a meaning corresponding to the BS EN ISO 14021:2016 standard. Especially, the term "pre-consumer waste" refers to any material diverted from the waste stream during manufacturing, such as cutting waste whereas the term "post-consumer waste" refers to waste material generated by households or businesses that can no longer be used for its intended purpose, such as plastic bottles that are no longer needed.

Consequently, the term "pre-consumer" or "post-industrial" membrane waste refers to any material produced during a manufacturing process of membranes, which material was discarded before leaving the custody of the producer and thus never used by a customer. Examples of post-industrial membrane waste include, for example, edge trimmings, off-spec material, expired material, and other scrap material.

Furthermore, the term "post-consumer" membrane waste refers to material that was generated by the consumer. Examples of post-consumer membrane waste include, for example, an old roofing membrane that was removed and replaced with a new one during roof renovation.

Generally, any type of recycled pre- or post-consumer polyvinylchloride membrane waste can be used for providing the core layer of the board.

Particularly, the detailed composition of the polyvinylchloride membrane waste depends on the origin of the membrane, especially on the type of the installation, in which the membrane has been used before being recycled. Roofing membranes must be securely fastened to the roof substrate to provide sufficient mechanical strength to resist the shearing forces applied on it due to high wind loads. In a mechanically attached roof system, the roofing membrane is fastened to the roof substrate by using screws and/or barbed plates, whereas in adhered roof systems, the membrane is adhered to the roof substrate via an adhesive layer. A ballasted roof system utilizes the weight of heavy materials, such as gravel or crushed stone, pavers, or concrete slabs, to hold the roofing membrane in place.

PVC-based roofing membranes used for providing mechanically adhered roof systems typically include one or more layers of fiber material, such as non-woven fabrics comprising synthetic organic and/or inorganic fibers, to improve the mechanical properties of the membrane. Furthermore, in adhered roof systems, the roofing membrane is adhered to a surface of the roof substrate, such as a cover board using an adhesive layer. At the end of service life, the roofing membrane is typically detached, for example by peeling, from the surface of the roof substrate resulting in complete destruction of the adhesive bond. During the deinstallation process, typically at least a portion of the adhesive material remains attached on the surface the membrane and, therefore, ends up in the recycled post-consumer polyvinylchloride membrane waste.

Typically used adhesives in adhered roof systems include, for example, acrylic adhesives, one- and two-component epoxide and polyurethane adhesives, and rubber-based adhesives. The adhesives can be chemically cured to improve the thermal stability of the adhesive bond. However, non-reactive adhesives, such as water- and solvent-based acrylic adhesives are also commonly used to provide adhered roof systems.

The adhesive material that is removed with the roofing membrane can also contain other substances that have been detached from the surface of the roof substrate during peeling of the membrane. For example, roof cover boards typically contain an upper facing layer, such as a paper layer or a coated fiberglass facer/layer, which may partially be detached from the cover board with the adhesive material during removal of the roofing membrane. Furthermore, the roofing membrane may also be directly attached to an insulation board in an adhered roof system. Typically materials of roof insulation boards include, for example, expanded polystyrene (EPS), extruded polystyrene (XPS), and polyisocyanurate (PIR).

Consequently, the recycled post-consumer polyvinylchloride membrane waste may, depending on the origin of the membrane waste material, contain significant amounts of other substances than PVC resin, for example, fragments of synthetic organic and/or inorganic fibers, such as polyester fibers, polypropylene fibers, or glass fibers, adhesive materials, such as acrylic, epoxide, or polyurethane polymers or rubbers, cellulose containing materials, fiberglass, and/or thermal insulation materials, such as expanded polystyrene (EPS), extruded polystyrene (XPS), and/or polyisocyanurate (PIR).

In some variations, the recycled post-consumer polyvinylchloride membrane waste has been derived from mechanically fastened and/or ballasted and/or adhered roof systems.

Particularly, core layer of the board comprises:
a thermoplastic bonding material including polyvinylchloride resin,
optionally fragments of synthetic organic and/or inorganic fibers, and
optionally fragments of cellulose containing material.

The term polyvinyl chloride (PVC) resin refers in the present disclosure to both homopolymers of polyvinyl chloride and co- and terpolymers of vinyl chloride with comonomers such as vinyl acetate, vinyl formate, alkyl vinyl ethers, ethylene, propylene, butylenes, vinylidene chloride, alkyl acrylates and methacrylates, alkyl maleates, and alkyl fumarates. Preferably, at least 80 wt.-%, more preferably 100 wt.-%, of the monomers of the PVC resin are vinyl chloride monomers.

The core layer can include polyvinylchloride resin in amounts in a range of from 1-85 wt.-%, for example.

Especially, the polyvinylchloride resin in the thermoplastic bonding material is a plasticized polyvinylchloride resin. The expression "plasticized PVC resin" is understood to mean that the PVC resin contained in the core layer comprises, in addition to the PVC resin, at least one plasticizer for PVC resins.

Examples of suitable plasticizers include but are not restricted to, for example, linear or branched phthalates such as di-isononyl phthalate (DINP), di-nonyl phthalate (L9P), diallyl phthalate (DAP), di-2-ethylhexyl-phthalate (DEHP), dioctyl phthalate (DOP), diisodecyl phthalate (DIDP), and mixed linear phthalates (911P). Other suitable plasticizers include phthalate-free plasticizers, such as trimellitate plasticizers, adipic polyesters, and biochemical plasticizers. Examples of biochemical plasticizers include epoxidized vegetable oils, for example, epoxidized soybean oil and epoxidized linseed oil and acetylated waxes and oils derived from plants, for example, acetylated castor wax and acetylated castor oil.

Examples of particularly suitable phthalate-free plasticizers include alkyl esters of benzoic acid, dialkyl esters of aliphatic dicarboxylic acids, polyesters of aliphatic dicarboxylic acids or of aliphatic di-, tri- and tetrols, the end groups of which are unesterified or have been esterified with monofunctional reagents, trialkyl esters of citric acid, acetylated trialkyl esters of citric acid, glycerol esters, benzoic diesters of mono-, di-, tri-, or polyalkylene glycols, trimethylolpropane esters, dialkyl esters of cyclohexanedicarboxylic acids, dialkyl esters of terephthalic acid, trialkyl esters of trimellitic acid, triaryl esters of phosphoric acid, diaryl alkyl esters of phosphoric acid, trialkyl esters of phosphoric acid, and aryl esters of alkanesulphonic acids. Further suitable plasticizers for the PVC resin include, fore example, polymeric plasticizers, which are commercially available, for example, from Dow under the trade name of Elvaloy®.

The core layer can include plasticizer in amounts in a range of from 1-75 wt.-%, for example.

In some cases, the core layer of the board comprises, in addition to the thermoplastic bonding material, fragments of synthetic organic and/or inorganic fibers and/or fragments of cellulose containing material.

The term "fragments of fibers" refers to particulate material obtained from mechanical processing, for example, grinding, milling, shredding, and/or chopping, of fiber-based material. The fragments of fibers can have multiple shapes, some of which are irregular.

The term "fragments of cellulose containing material" refers to particulate material obtained from mechanical processing of a cellulose containing material. The fragments of the cellulose containing material can have multiple shapes, generally an irregular shape.

The fragments of fragments of synthetic organic and/or inorganic fibers and/or the fragments of cellulose containing material, if present in the core layer, are generally randomly distributed relative to each other.

In one some instances, the fragments of synthetic organic and/or inorganic fibers and/or the fragments of cellulose containing material are uniformly distributed throughout the entire volume of the core layer. The expression "uniformly distributed" is understood to mean that the fragments are present in essentially all portions of the core layer but it does not necessarily imply that the distribution is uniform throughout the core layer.

In some cases, the fragments of synthetic organic and/or inorganic fibers and/or the fragments of cellulose containing material are connected by the use of the thermoplastic bonding material. Specifically, the fragments of the synthetic organic and/or inorganic fibers and/or the fragments of cellulose containing material are connected to each other with the thermoplastic bonding material with random connection points between the fragments.

In some variations, the fibers include at least one of polyester fibers, polypropylene fibers, nylon fibers, polyamide fibers, glass fibers, aramid fibers, wollastonite fibers, and carbon fibers, particularly at least one of polypropylene fibers, polyester fibers, and glass fibers.

Particularly, the fragments of the cellulose containing material may originate from recycled paper and/or packaging waste materials, especially from recycled foodstuff packages and beverage cups including carboard or paper board, particularly plastic coated carboard or paper board.

In some cases, the cellulose containing material includes at least one of paper, cardboard, and paperboard.

In some instances, the thermoplastic bonding material of the core layer further includes a thermoplastic resin different from the polyvinylchloride resin, preferably polyethylene.

The term "polyethylene" refers in the present disclosure to ethylene homopolymers and ethylene copolymers.

Examples of suitable polyethylenes include, but are not restricted to, low-density polyethylene (LDPE) or linear low-density polyethylene (LLDPE), or high-density polyethylene (HDPE), preferably linear low-density polyethylene (LLDPE).

The polyethylene contained in the thermoplastic bonding material may originate, for example, from a recycled waste material comprising the cellulose containing material, such as recycled foodstuff packages and beverage cups including plastic coated carboard or paper board. However, the polyethylene may also originate from another recycled waste material stream, for example, post-industrial or post-consumer plastic waste, for example, recycled plastic bags, particularly polyethylene based plastic bags.

The board comprises, in addition to the core layer, a first facing layer directly adjacent to the first major surface of the core layer.

The first facing layer may, for example, be selected from a paper layer, a plastic film, fiberglass coating, and a layer of fiber material. The term "fiberglass" refers here to fiber-reinforced plastic using glass fibers. The plastic matrix of the fiberglass material may be a thermoset polymer matrix, such as epoxy, polyester resin, or vinyl ester resin matrix, or a thermoplastic polymer matrix.

The term "fiber material" refers to materials composed of fibers. A fiber material can comprise short fibers, long fibers, spun fibers (yarns), or filaments. Furthermore, the fibers can moreover be aligned or drawn fibers. Suitable fiber materials used in the first facing layer include, for example, woven and non-woven fabrics and scrims.

The term "non-woven fabric" designates in the present disclosure materials composed of fibers, which are bonded together by using chemical, mechanical, or thermal bonding means, and which are neither woven nor knitted. Non-woven fabrics can be produced, for example, by using a carding or needle punching process, in which the fibers are mechanically entangled to obtain the nonwoven fabric. In chemical bonding, chemical binders such as adhesive materials are used to hold the fibers together in a nonwoven fabric.

The term "non-woven scrim" designates in the present disclosure web-like non-woven products composed of yarns, which lay on top of each other and are chemically bonded to each other. Typical materials for non-woven scrims include metals, fiberglass, and plastics, particularly polyester, polypropylene, polyethylene, and polyethylene terephthalate (PET).

In some cases, the first facing layer includes at least one of a paper layer, for example a Kraft paper, a plastic film, and a fiberglass coating. The fiberglass coating may further be composed of one or more layers of a fiberglass material.

In some instances, the board further comprises a second facing layer, preferably including at least one of a paper layer, for example a Kraft paper, a cellophane film, a plastic film, a fiberglass coating, and a layer of fiber material.

Furthermore, the first and/or second facing layer may be composed of a single layer of material or be a composite layer composed of at least two layers of different types of materials. For example, the first and/or second facing layer(s) may include at least one of a fiberglass coating, a foil coating, cellophane material, or a paper layer, such as Kraft paper. The foil coating including at least one layer of a foil material may function as thermal insulation that inhibits radiant heat transfer.

In some cases, the first facing layer includes a paper layer, such as a Kraft paper, and second facing layer comprises at least one of a fiberglass coating, a foil coating, or a cellophane material.

The board may also further comprise a sealant layer covering at least a portion of the external surface of the first facing layer and/or the second facing layer on the side opposite to the side of the core layer, wherein the sealant layer includes, for example, a fire proof coating and/or a silicone-based coating.

Different embodiments of these boards are described below in connection with FIGS. 1-3.

FIG. 1 shows cross-section of a board (1) comprising a core layer (2) having first and second major surfaces and a first facing layer (3) directly adjacent to the first major surface of the core layer (2).

Figure 2:
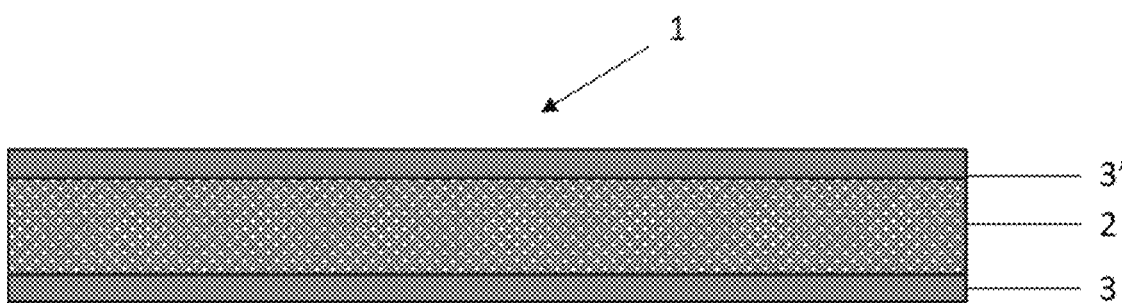
FIG. 2 is a schematic diagram showing a cross-section of a according to another embodiment.

FIG. 2 shows cross-section of a board (1) comprising a core layer (2) and a first facing layer (3) directly adjacent to the first major surface of the core layer (2) and a second facing layer (3') directly adjacent to the second major surface of the core layer (2).

Figure 3:
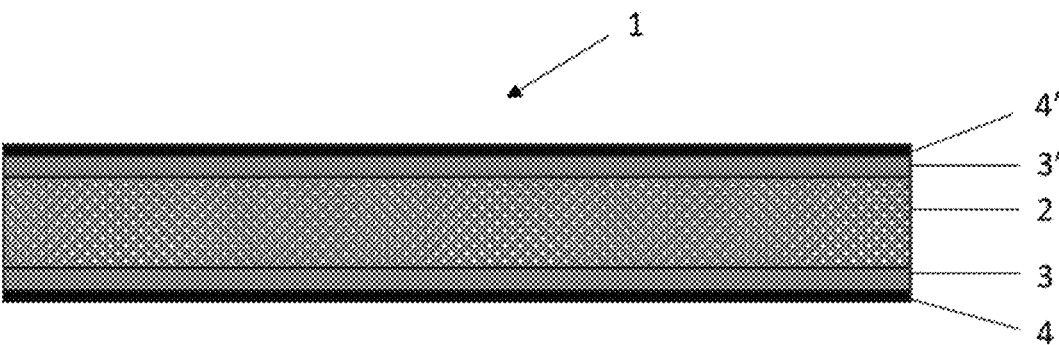
FIG. 3 is a schematic diagram showing a cross-section of a board according to yet another embodiment.

FIG. 3 shows cross-section of a board (1) comprising a core layer (2), a first facing layer (3), a second facing layer (3'), a sealant layer (4) covering the external surface of the first facing layer on the side opposite to the side of the core layer, and a second sealant layer (4') covering the external surface of the second facing layer (3') on the side opposite to the side of the core layer.

A further aspect of this disclosure is a method for producing a board comprising steps of:

I) Providing a waste material feedstock including a first waste material fraction comprising polyvinylchloride membrane waste and/or a second waste material fraction comprising residual fluff obtained as a by-product from mechanical recycling of polyvinylchloride membrane waste and II) Heating and compressing the waste material feedstock obtained from step I) within a fixture to form a core layer of the board.

In step II), the waste material feedstock is fed into a pressing machine and pressed at an elevated temperature to form the core layer of the board. For example, the temperature of the surfaces of the pressing machine, between which the combined waste material feedstock is compressed in step III), can be in the range of 300-480° F., particularly 350-430° F.

Suitable equipment for use in step II) of the method include, for example, conventional hot pressing machines, which are known to the skilled person.

In some cases, step I) of the method comprises:

providing the waste material fraction(s), optionally subjecting the fraction(s) to a treatment to reduce their particle size, and mixing the fractions with each other to obtain the waste material feedstock.

The mixing step can be conducted using any conventional equipment known to the person skilled in the art, such as a dry pug mixer.

In some instances, the first and/or second waste fraction is obtained from mechanical recycling of pre-consumer and/or post-consumer polyvinylchloride membrane waste. Particularly, the post-consumer polyvinylchloride membrane waste has been derived from mechanically fastened and/or ballasted and/or adhered roof systems.

Mechanical recycling of PVC membrane waste typically comprises decreasing the particle size of the waste material, for example, by grinding, shredding, and/or chopping, particularly to a range of 0.5-5 mm, particularly 1-4 mm, and collecting any residual fluff fraction as a by-product that may be separated from the polyvinylchloride membrane waste during the particle size reduction step. Mechanical recycling processes comprising reducing the particle size of the membrane waste material are known to the skilled person.

Depending on the source of the PVC membrane waste, different types of materials can be obtained as main and by-product(s) from the mechanical recycling process. As already discussed, roofing membranes used to provide mechanically attached roof systems or adhered roof systems may comprise one or more fiber based layers, such as non-woven fabrics and scrims.

Typical synthetic organic fibers used in PVC membranes include, for example, polyester fibers, polypropylene fibers, polyethylene fibers, nylon fibers, and polyamide fibers. Commonly used inorganic fibers include, for example, glass fibers, aramid fibers, wollastonite fibers, and carbon fibers. The synthetic organic and inorganic fibers are particularly used in roofing membranes as reinforcing and/or backing layers to provide the membrane with required mechanical properties, compatibility with adhesives, and/or to fulfill requirements of fire resistance classification.

Furthermore, post-consumer polyvinylchloride membrane waste derived from adhered roof systems may include, in addition to PVC resin and synthetic and/or inorganic fibers, substantial amount of other types of waste materials, such as fragments of adhesives, paper, plastics (other than PVC), fiberglass, and/or thermal insulation materials, such as expanded polystyrene (EPS), extruded polystyrene (XPS), and/or polyisocyanurate (PIR), which are included in the PVC membrane waste during demolition of the old roof system.

Independent of the origin of the PVC membrane waste, a PVC resin rich fraction is typically obtained as a main product from the mechanical recycling process. In case the PVC membrane waste contains membranes with fiber-based layers, for example, membranes from mechanically attached roof systems, at least two different products are obtained from the mechanical recycling process; a PVC resin rich fraction as a main product and a by-product, also known as a "residual fluff fraction", which is separated from the PVC membrane waste during the particle size reduction step.

The residual fluff fraction is mainly composed of fragments of synthetic organic/and or inorganic fibers originating from the fiber-based layers but it typically also contains other constituents, particularly plasticized polyvinylchloride resin.

In some instances, the first waste material fraction comprises a polyvinylchloride resin rich fraction obtained as a main product from mechanical recycling of polyvinylchloride membrane waste, preferably post-consumer polyvinylchloride membrane waste, particularly derived from mechanically fastened and/or ballasted and/or adhered roof systems.

The raw PVC resin rich fraction obtained directly from a mechanical recycling process of PVC membrane waste can be used in the first waste fraction without any further processing. Alternative, the raw PVC resin rich fraction can be further processed, for example, to granules or pellets, which are then included into the first waste fraction in the method for producing the board.

In other instances, the second waste fraction includes a residual fluff fraction obtained as a by-product from mechanical recycling of PVC membrane waste, preferably post-consumer PVC membrane waste, particularly derived from mechanically fastened and/or ballasted and/or adhered roof systems.

Furthermore, the raw residual fluff fraction obtained directly from a mechanical recycling process of PVC membrane waste may be used as such or further processed, for example by mixing it with polymers, for example with PVC resin, in a high speed mixer to an agglomerate, which is then included into the second waste fraction.

In some case, the PVC resin rich fraction obtained as a main product from mechanical recycling of PVC membrane waste comprises at least 50 wt.-% of plasticized PVC resin, particularly at least 75 wt.-% of plasticized PVC resin and/or the residual fluff fraction obtained as a by-product from mechanical recycling of PVC membrane waste comprises fragments of synthetic organic and/or inorganic fibers, such as polypropylene, polyester and/or glass fibers and not more than 15 wt.-% of plasticized PVC resin, preferably not more than 5 wt.-% of plasticized PVC resin.

As the waste material feedstock is heated and compressed, some of the polymeric constituents, for example the PVC resin, melt and act after re-solidification as a thermoplastic bonding material connecting the non-meltable materials, for example, the fragments of the synthetic organic and/or inorganic fibers in the formed core layer.

In other cases, the method comprises a further step of positioning a first and a second facing layer on opposing heated surfaces of the hot pressing machine before the combined waste material feedstock is heated and compressed. The facing layers then act as carrier films preventing the surfaces of the hot pressing machine from sticking to the major surfaces of the formed core layer after the heating and compression step.

In some instances, the waste material feedstock further includes a third waste material fraction comprising shredded scrap paper and/or packaging waste, particularly foodstuff packages and/or beverage cups including, for example, carboard and/or paper board, particularly plastic coated carboard and/or paper board.

In some cases embodiment, the third waste material fraction comprises fragments of cellulose containing material and polyethylene.

The polyethylene contained in the third waste material fraction may be present on the surface of the fragments of cellulose containing material. This is especially the case if shredded packaging waste including plastic coated cardboard and/paperboard is used in the third waste material fraction. The third waste material fraction may further include other types of materials, such as other plastics than polyethylene and/or metals. For example, aseptic food packages typically include plastic and metal coated, for example aluminum coated, cardboard and/or paperboard. In case aseptic package waste is included into the third waste material fraction, at least a portion of the fragments of cellulose containing material would contain polyethylene and metal, for example, aluminum, as a foil covering a portion of the outer surface of the fragments.

In some instances, the waste material feedstock further comprises a fourth waste material fraction comprising recycled polyethylene-based post-industrial or post-consumer plastic waste, preferably recycled polyethylene based plastic bags.

The term "polyethylene-based" is understood to mean that the recycled plastic waste includes polyethylene as the main polymer component, for example making up at least 55 wt.-%, preferably at least 75 wt.-%, more preferably at least 85 wt.-% of the total weight of the recycled plastic waste.

In some cases, the waste material feedstock comprises:

0-100 wt.-%, especially 15-85 wt.-% of the first waste material fraction and 0-100 wt.-%, especially 15-85 wt.-% of the second waste material fraction, all proportions being based on the total weight of the waste material feedstock.

12

EXAMPLES

Preparation of Tested Boards

The following waste material fractions were used for producing the boards:

1) PVC resin rich fraction obtained from mechanical recycling of post-consumer PVC membrane waste
2) Residual fluff obtained from mechanical recycling of post-consumer PVC membrane waste
3) Shredded aseptic carton packages
4) Post-consumer plastic bags (mainly LDPE)

In the process for preparing the boards, the waste material fractions were mixed with each other using a dry pug mixer and heated to obtain a combined waste feedstock, which was compressed within a fixture of a hot pressing machine to form a core layer. Furthermore, two facing layers were positioned between the upper and lower heated surfaces of the press and the uncompressed waste feedstock before the heating and compressing step was conducted. The facing layers were used as carrier films to prevent the surface of the press from sticking to the formed core layer.

The temperature of the upper and lower surfaces of the press during operation were 385° F. and 395° F., respectively. The first (upper) facing layer was a fiberglass layer.

Commercially available roof cover boards Everboard® (Ref-1) (from Continuus Materials) and DensDec Prime (Ref-2) (from Georgia-Pacific) were used as reference examples.

Water Absorption

Water absorption was measured according to ASTM C473-07 standard ("Water Resistance of Core-Treated Water-Repellent Gypsum Panel Products"). The result of the test is expressed as percentual change in weight of the sample after water immersion for two hours.

Weight Change after Humidity Exposure of 28 Days

The sample was stored in a humidity chamber @122° F., 95% humidity for 28 days and the weight of the sample was measured before and after the storage period.

Thickness Change after Humidity Exposure of 28 Days

The sample was stored in a humidity chamber @122° F., 95% humidity for 28 days and the thickness of the sample was measured before and after the storage period.

Drop Impact (Depth) Test

Impact resistance was tested according to EN EN-12691-2:2018 standard (Ex-1 and Ex-2) and according to UL2218 standard (Ex-3, Ex-4, Ref-1, and Ref-2) using the drop height as defined in the standard.

TABLE 2

| Compositions [wt.-%] | Ex-1 | Ex-2 | Ex-3 | Ex-4 | [a]Ref-1 | [b]Ref-2 |
|---|---|---|---|---|---|---|
| Feedstock 1 | 100 | — | 20 | 60 | | |
| Feedstock 2 | — | 100 | 20 | — | | |
| Feedstock 3 | — | — | 60 | 20 | | |
| Feedstock 4 | — | — | — | 20 | | |
| Total | 100 | 100 | 100 | 100 | | |
| Thickness [inch] | 0.55 | 0.25 | 0.63 | 0.42 | 0.51 | 0.51 |
| Weight [lbs/ft²] | 3.56 | 1.46 | 3.17 | 2.47 | 2.59 | 1.97 |
| Water absorption [%] | 1.0 | 0.5 | 19.83 | 4.31 | 3.75 | 10.06 |
| Weight chance after humidity exposure 28 days @104° F. [%] | 1.57 | 1.75 | 4.47 | 1.86 | 5.30 | 0.60 |
| Thickness chance after humidity exposure 28 days @104° F. [%] | 1 | 2 | 12 | 4 | 6.8 | 1 |
| Impact resistance [inch] | 0.020 | 0.013 | 0.040 | 0.017 | 0.034 | 0.270 |

The invention claimed is:

1. A method for producing a board that is suitable for use in a construction related application and includes (i) a core layer having first and second major surfaces, and (ii) a first facing layer directly adjacent to the first major surface of the core layer, wherein the core layer includes recycled polyvinylchloride membrane waste material and comprises a thermoplastic bonding material including polyvinylchloride resin, the method comprising steps of:

I) providing a waste material feedstock including a first waste material fraction comprising polyvinylchloride membrane waste;

II) providing a second waste material fraction comprising residual fluff, which is a by-product that is separated from polyvinylchloride membrane waste when the membrane waste is processed to decrease the particle size of the membrane waste;

III) combining the first waste material fraction and the second waste material fraction to provide a waste material feedstock having 15-85 wt. % of the first waste material fraction and 15-85 wt. % of the second waste material fraction, IV) heating and compressing the waste material feedstock obtained from step III) within a fixture to form the core layer of the board.

2. The method according to claim 1, wherein step III) further comprises:

mixing the first waste material fraction and the second waste material fraction with each other to obtain the waste material feedstock.

3. The method according to claim 1, wherein the first and/or second waste fraction is/are obtained from mechanical recycling of pre-consumer and/or post-consumer polyvinylchloride membrane waste.

4. The method according to claim 3, wherein the post-consumer polyvinylchloride membrane waste has been derived from mechanically fastened and/or ballasted and/or adhered roof systems.

5. The method according to claim 1, wherein first waste material fraction comprises a polyvinylchloride resin rich fraction obtained as a main product from mechanical recycling of polyvinylchloride membrane waste.

6. The method according to claim 1, wherein the second waste material fraction comprises fragments of synthetic and/or inorganic fibers.

7. The method according to claim 1, wherein the waste material feedstock further includes a third waste material fraction comprising shredded scrap paper and/or packaging waste and/or a fourth waste material fraction comprising recycled polyethylene-based post-industrial or post-consumer plastic waste.

8. The method according to claim 7, wherein the third waste material fraction comprises fragments of cellulose containing material and polyethylene.

9. The method according to claim 1, further comprising producing the residual fluff by separating it from the polyvinyl chloride membrane waste when the membrane waste is subjected to grinding, shredding, or chopping to reduce the particle size of the membrane waste, and then collecting the residual fluff.

10. The method according to claim 1, further comprising, after step III), positioning the first facing layer and a second facing layer on opposing heated surfaces of a hot-pressing machine, and then, in step IV) heating and compressing the waste material feedstock with the hot-pressing machine.

* * * * *